March 25, 1952 L. J. ANDERSON 2,590,292

SHIELDED MAGNETIC SOUND-HEAD AND TAPE GUIDE ASSEMBLY

Filed Nov. 1, 1949

Inventor

Leslie J. Anderson

By Morris A. Rabkin

Attorney

Patented Mar. 25, 1952

2,590,292

UNITED STATES PATENT OFFICE 2,590,292

SHIELDED MAGNETIC SOUND-HEAD AND TAPE-GUIDE ASSEMBLY

Leslie J. Anderson, Moorestown, N. J., assignor to Radio Corporation of America, a corporation of Delaware Application November 1, 1949, Serial No. 124,894

5 Claims. (Cl. 179—100.2)

Figures 1, 2, 3, 4:
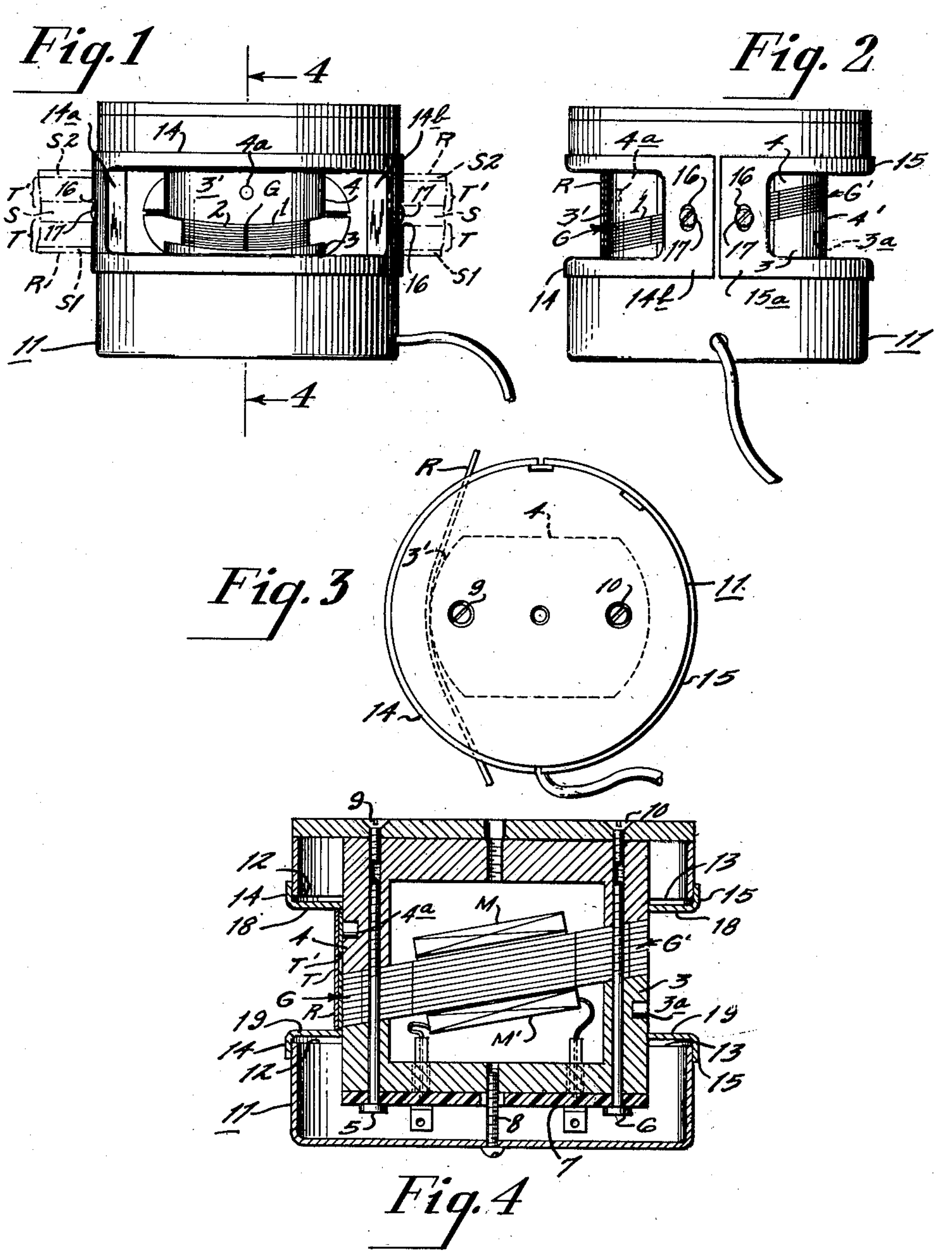

This invention relates to magnetic transducers or sound-heads for use in conjunction with tape-like magnetic records.

The problem with which the invention is especially concerned is that of ensuring that the sound-track of a magnetic tape record is presented to the non-magnetic gap of an associated transducer at the precise angle required to ensure optimum coupling between the sound-track and the "fringing flux" adjacent to the gap. Obviously, this problem is a particularly serious one in magnetic-recording systems designed to handle plural or multiple-track records since, in such systems, misalignment may result either in cross-talk between the tracks or partial erasing of the wrong track.

The invention is also concerned with the problem of shielding the fringing flux, and its area of origin, from stray magnetic fields.

One common way of guiding a flexible record to and away from the non-magnetic gap in a magnetic transducer is to provide a stationary channel or a grooved roller on each side of the transducer. One trouble with such record-guides is that one or more of several elements of the system may become misaligned, either during their assembly, or due to wear. This latter hazard is always present when the guides comprise rotary members. Furthermore, shocks or tremors, of external origin may produce undulations in that portion of the rapidly moving flexible record which lies between a given guide member and the transducer. Accordingly, it has heretofore been proposed to provide a transducer or sound-head having a pair of flanges disposed on opposite sides of the non-magnetic gap and integral with the sound-head structure. Here, however, it has been found that the mere presence of the flanges on the structure of the head interferes with the "finishing" (i. e., grinding and polishing) of the polar extremities of the magnet of the unit and increases the cost of manufacture by increasing the production-percentage of non-usable heads. Furthermore, any inaccuracy in the original alignment of the guide flanges can only be corrected by an expensive machining operation.

The foregoing and other less apparent objections to present-day tape-guiding arrangements are obviated in accordance with the present invention by enclosing the sound-head in a shield-can having an over-size opening through which the non-magnetic gap of the head is accessible, and by the provision within said over-size opening of an adjustable, preferably arcuate channel guide or frame, through which the record moves in approaching and leaving the gap. The adjusting mechanism for the frame is accessible from the exterior of the assembly and may be moved in any direction required to present the sound-track of the moving record to the gap at the precise 90° angle required to achieve optimum magnetic coupling between the sound-track and the flux adjacent to the gap.

While the invention will be described as applied to a double-ended sound-head of the type suitable for use in conjunction with plural-track records, it will be apparent as the description proceeds that the invention is also applicable to conventional single-ended sound-heads.

In the drawing, wherein the invention is shown as applied to the double-ended sound-head claimed by Earl E. Masterson in copending application Serial No. 62,754, filed November 30, 1948 (now Patent Number 2,524,063) and assigned to the same assignee as the subject case: Fig. 1 is a front elevation, Fig. 2 is a side elevation, Fig. 3 is a plan view of a combined shield-can and record guide embodying the invention, and Fig. 4 is a sectional view taken on the line 4—4 of Fig. 1.

In the sound-head assembly shown in the drawings, the core of the head comprises a laminated magnetic structure comprising two C-shaped pieces 1 and 2 arranged with their polar extremities or ends in juxtaposition to provide a non-magnetic tap G, G' at each end of said structure. As shown more clearly in Fig. 4, the laminations of which each C-shaped part is formed are cut and stacked at an angle with respect to the horizontal so that the gaps G, G' at the opposite ends of the structure are offset from each other in the vertical direction a distance corresponding approximately to the common thickness dimension of the two pieces. As taught by Masterson, in order to reduce the possibility of cross-talk between the sound tracks T, T' of the tape-like record R which the sound-head is designed to serve, the thickness dimension of the magnetic core should preferably be very slightly less than one-half the width of the record. Thus, in one case, wherein the tape-record was 0.250 of an inch wide, the core was constituted of ten mu metal laminations each 0.010'' thick, hence the overall thickness of the core was approximately 0.025'' less than one-half the width of the tape. This permitted the use of a non-magnetic space S of 0.030'' along the center of the tape between the two sound tracks T, T' and a clearance space S1, S2, of 0.010'' between the outer edge of each track and the adjacent edge of the tape.

As shown more clearly in Figs. 2 and 3, the surfaces of the core structure adjacent to the non-magnetic gaps G and G' are outwardly convex so that the tape record R (Fig. 3) may the more easily be subject to tension in passing over said gaps. As shown in Fig. 4, a field coil M, M', is provided on the midsection of each of the C-shaped parts 1 and 2 of the core.

As shown in Fig. 4, the magnetic core structure 1 and 2, with the coils M and M' in position thereon, is clamped between the separable parts 3 and 4 of an inner, bi-part, cylinder constituted of aluminum or other preferably light-weight non-magnetic material. These non-magnetic parts 3 and 4 have diametrically opposed convex outer wall portions 3' and 4' which lie flush with the convex surface adjacent to each of the gaps G and G' in the magnetic core, and each occupy that half of the space at the front of the core which is served by the other gap. As also shown in Fig. 4 (and in Figs. 1 and 2) these convex non-magnetic surfaces 3' and 4' may each be provided with one or more non-magnetic, wear-resisting, plug-like inserts 3*a*, 4*a* for minimizing wear incident to the movement of the tape thereon.

The core is clamped between the clamping elements 3 and 4 by non-mangetic screws 5 and 6 (Fig. 4) which extend through the hollow inner portion of the core. These screws also serve to secure an insulating terminal board 7 to the bottom of the lower clamping element 3.

In accordance with the present invention the magnetic core structure, including its clamping elements 3 and 4 are mounted, as by means of short non-magnetic screws 8, 9 and 10 within the hollow interior of a preferably cylindrical housing 11 having a pair of oppositely located openings 12 and 13 in its side walls through which the diametrically opposed non-magnetic gaps G and G' of the core 1—2 are accessible. As shown more clearly in Fig. 4, the openings 12 and 13 in the casing or housing 11 are of a width appreciably larger than the width of the tape R so that each may accommodate a movable channel or frame 14, 15, respectively, for aligning the tape-like record, and hence the sound-tracks T and T' thereon, with respect to the separate gaps G and G' in the core of the head. The opposite end portions 14*a*, 14*b*, 15*a*, 15*b*, of the frames are each provided with an elongated slot 16 through which a screw 17, having a shank narrower than its slot, extends into the wall of the housing. The direction of extension of the slots 16 is the same as that of the non-magnetic gaps G, G' in the core, hence the tape guides 14 and 15 may be moved either up and down at either or both ends, to shift the tape R to the precise path required to ensure optimum coupling between each of the sound-tracks T and T' and the "fringing flux" adjacent to the gap which serves that sound-track.

The width (in this case the vertical dimension) of the opening in each tape guide is just sufficient to accommodate the tape R which is prevented from sliding up and down on the convex outer surface of the sound-head by inwardly turned flanges 18 and 19 (see Fig. 4) which abut said convex surfaces. The ends 14*a*, 14*b*, etc., of each frame or guide slant inwardly in the direction of the non-magnetic gap G, G' and define the boundaries of a curved tape-path which is tangent to the convex surface of the core structure of the sound-head.

The housing 11 to which the tape-guides 14 and 15 are adjustably secured, and, if desired, the tape-guides themselves are constituted in accordance with the invention of mu-metal or other highly permeable ferrous metal, or alloy, so that the said parts comprise a shield for protecting the fringing flux, and its area of origin, from stray magnetic fields.

It will now be apparent that the present invention provides a shielded magnetic sound-head and tape-guide assembly and one capable of adjustment to the precise angle required to insure optimum coupling between the sound-track or tracks of a tape-like record and the fringing flux adjacent to the non-magnetic gap or gaps of the sound-head portion of the assembly.

What is claimed is:

1. A sound-head assembly for a magnetic-tape record, said assembly comprising a magnetic structure containing a non-magnetic gap over which said record travels during recording or reproducing intervals, a housing in which said magnetic structure is mounted, said housing containing an opening through which said tape passes in approaching and leaving said non-magnetic gap, and guide means supported on and for angular adjustment with respect to said housing adjacent to said opening for presenting said tape to said non-magnetic gap at a desired angle.

2. The invention as set forth in claim 1 and wherein said housing is constituted of a highly permeable magnetic material and constitutes a magnetic shield for said magnetic structure.

3. A sound-head assembly in accordance with claim 1 for serving a tape-like record of the type containing a longitudinally-magnetizable sound-track, and wherein said guide means is mounted for tiltable movement in a plane tangent to said magnetic structure at said non-magnetic gap, whereby said guide means may be adjusted to present said sound-track to said gap at an angle of 90°.

4. A sound-head assembly for a magnetic-tape record, said assembly comprising a magnetic structure containing a non-magnetic gap over which said record travels during recording or reproducing intervals, a housing in which said magnetic structure is mounted, said housing containing an opening through which said tape passes in approaching and leaving said non-magnetic gap, and guide means adjustably supported on said housing adjacent to said opening for presenting said tape to said non-magnetic gap at a desired angle, the surface of said magnetic structure which contains said non-magnetic gap comprising a convex surface, and said tape guide comprising a pair of inwardly inclined end surfaces extending into said opening in said housing on opposite sides of said gap to define a tape path that is tangent to said convex surface of said magnetic structure.

5. A sound-head assembly for magnetic-tape records, said assembly comprising a magnetic structure containing a non-magnetic gap over which said record travels during recording or reproducing intervals, a housing in which said magnetic structure is mounted, said housing containing an opening through which said tape passes in approaching and leaving said non-magnetic gap, and guide means adjustably supported on said housing adjacent to said opening for presenting said tape to said non-magnetic gap at a desired angle, the surface of said magnetic structure which contains said non-magnetic gap comprising a convex surface, and said tape guide comprising a pair of parallelly arranged, inwardly directed flanges of a concave contour complementary to said convex surface and mounted in contact with said convex surface on opposite sides of said tape to prevent lateral displacement of said tape with respect to said non-magnetic gap.

LESLIE J. ANDERSON.

REFERENCES CITED

The following references are of record in the file of this patent:

UNITED STATES PATENTS

| Number | Name | Date |
|---|---|---|
| 2,078,357 | Woodmansee | Apr. 27, 1937 |
| 2,277,305 | Clopten | Mar. 24, 1942 |